Sept. 6, 1932. A. PEARSON 1,876,150
POTATO PICKER
Filed July 22, 1930 5 Sheets-Sheet 1

Inventor
Anton Pearson,
By Clarence A. O'Brien
Attorney

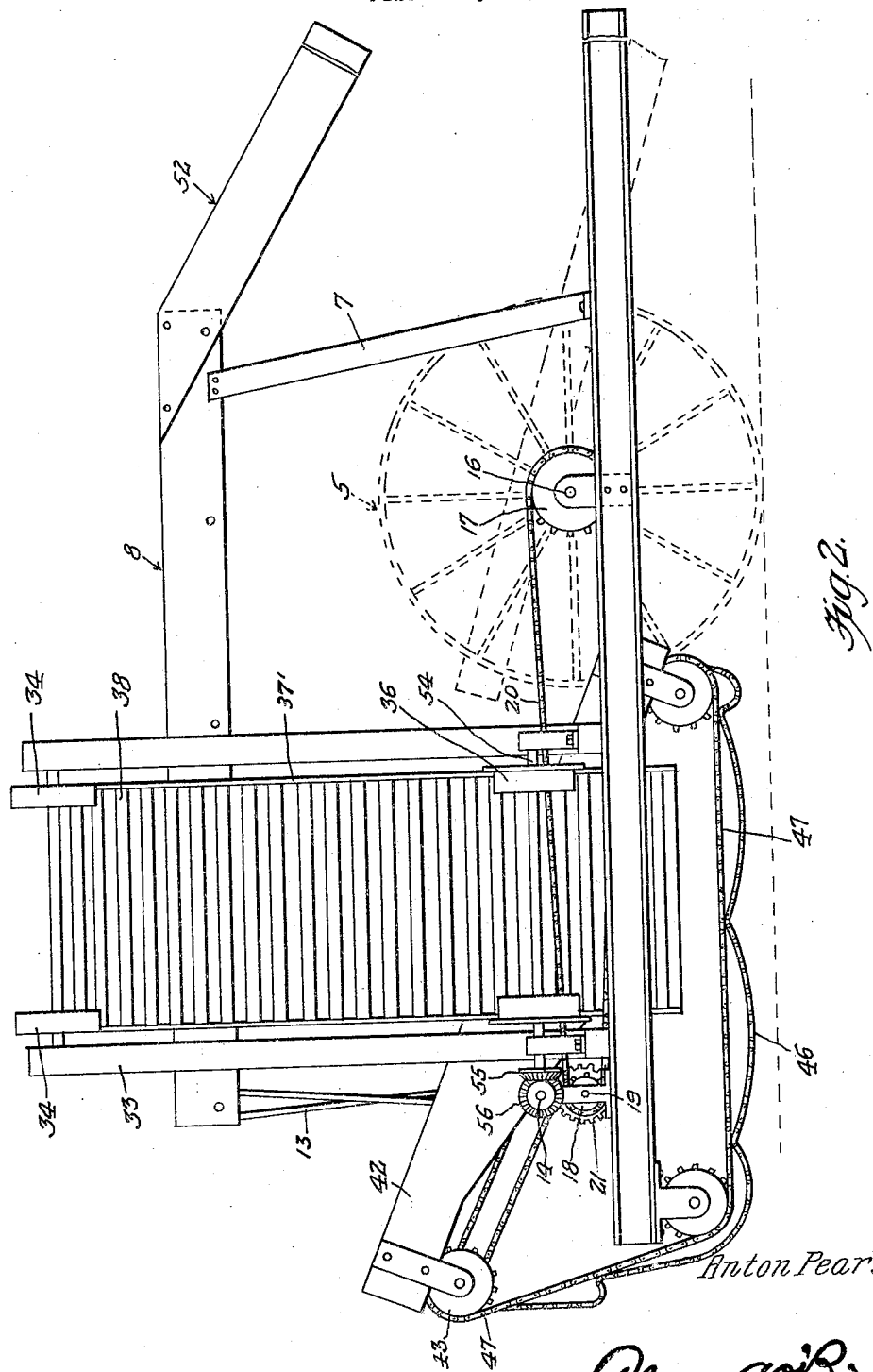

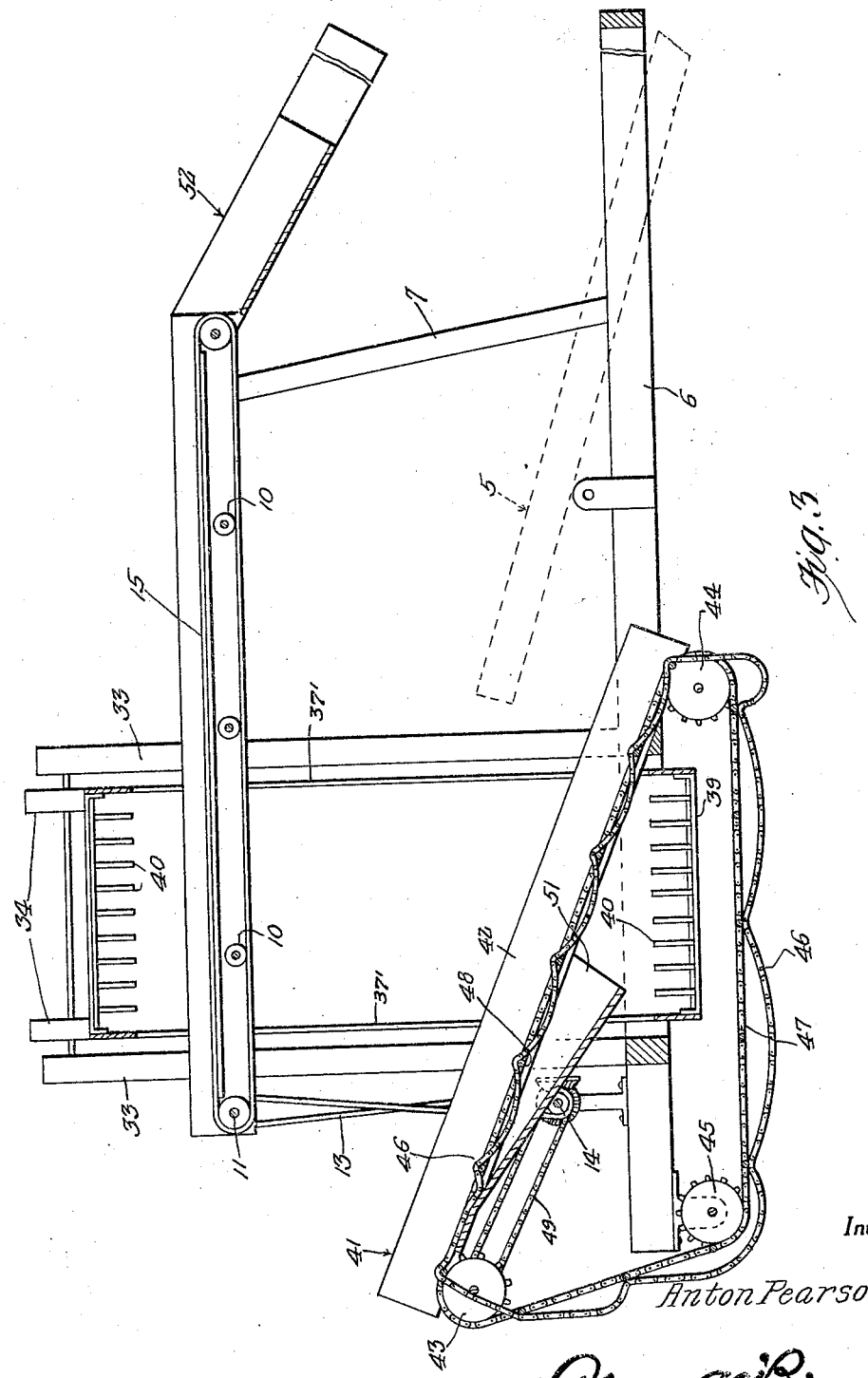

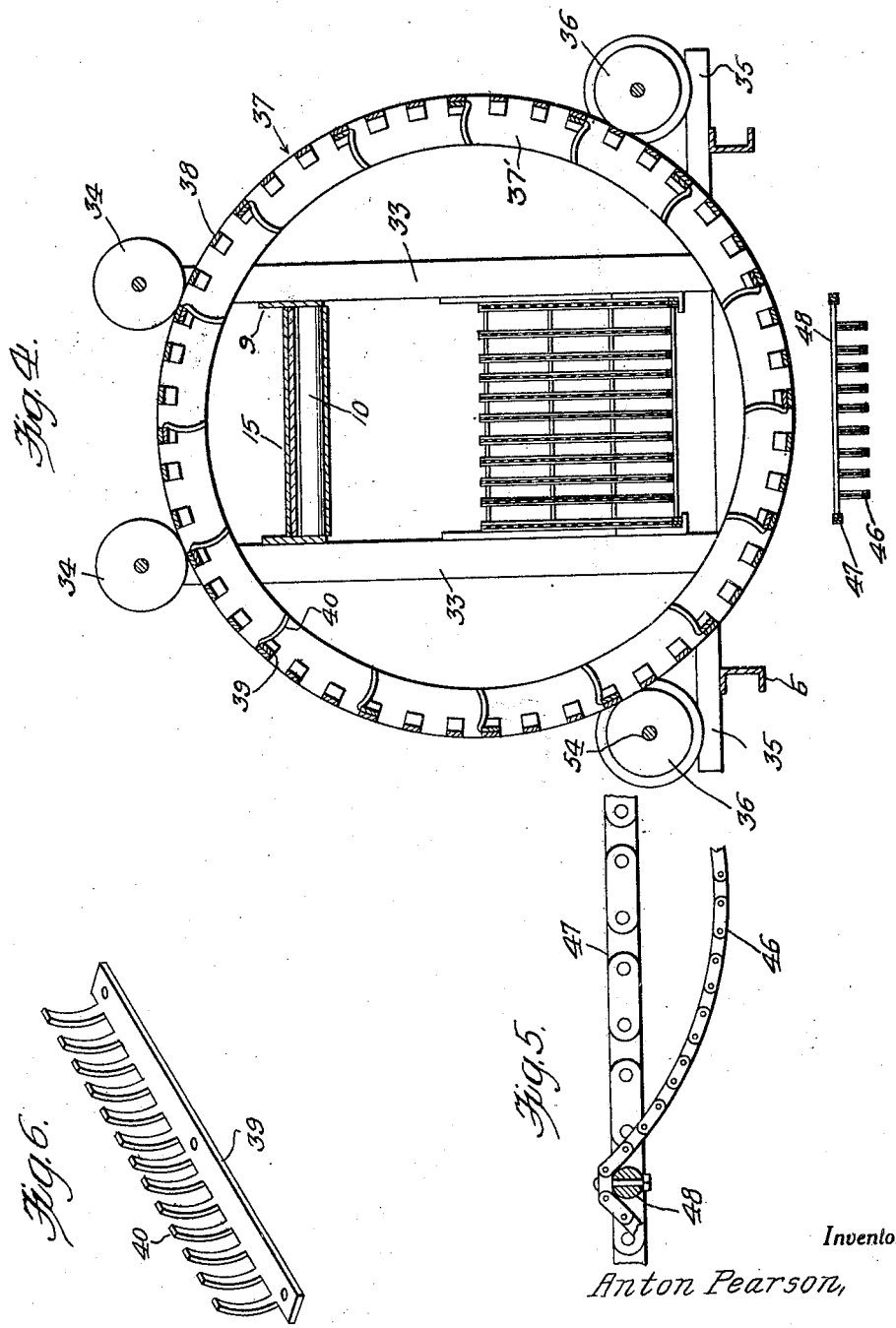

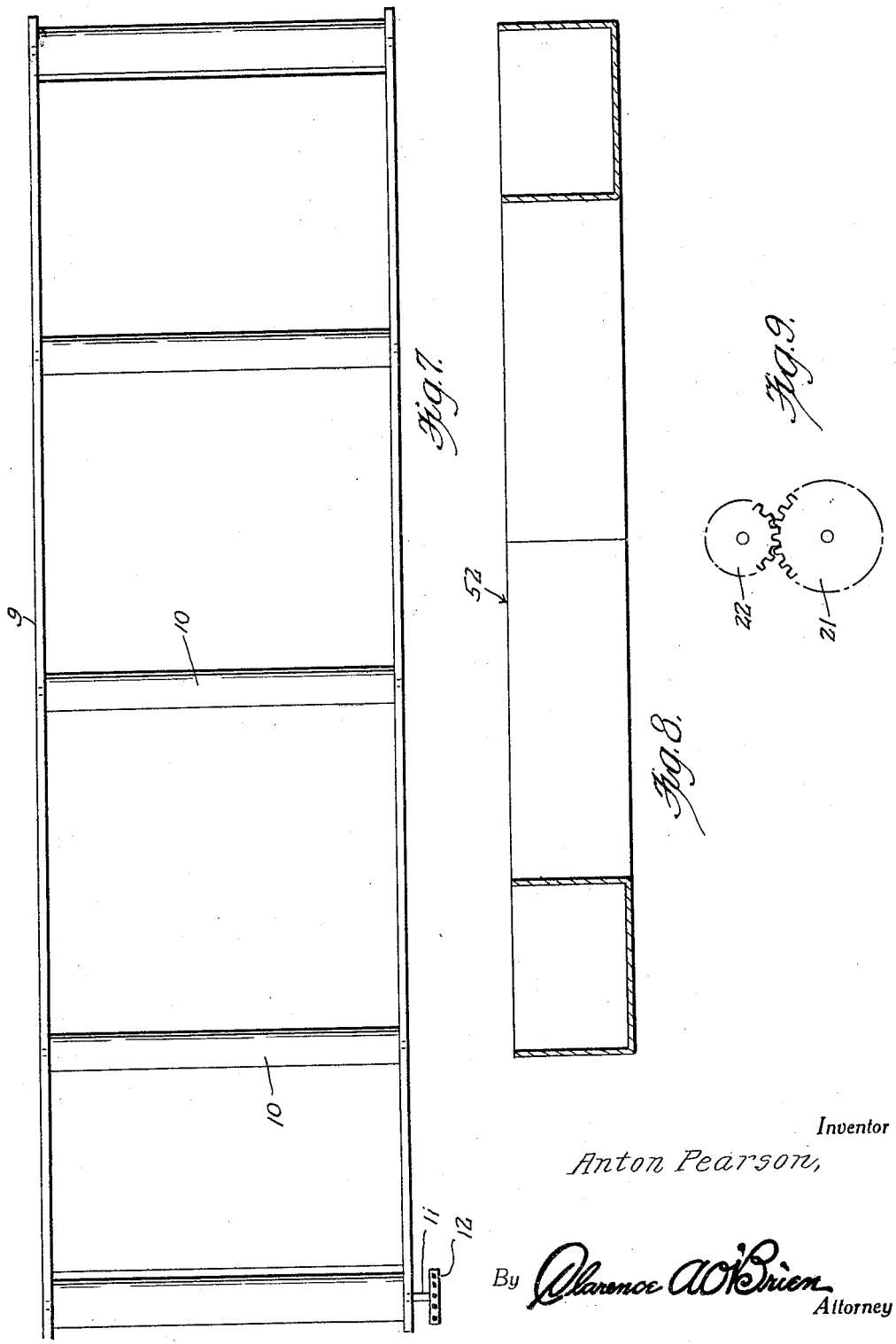

Patented Sept. 6, 1932

1,876,150

UNITED STATES PATENT OFFICE

ANTON PEARSON, OF SILVERHILL, ALABAMA

POTATO PICKER

Application filed July 22, 1930. Serial No. 469,880.

This invention appertains to new and useful improvements in potato pickers and more particularly to a novel machine whereby potatoes can be efficiently picked from the vines immediately subsequent to the digging thereof.

During the course of the following specification and claims, several important objects and advantages of the invention will readily become apparent to the reader.

In the drawings:—

Fig. 2 represents a side elevational view of the machine.

Fig. 3 represents a longitudinal sectional view through the machine.

Fig. 4 represents a vertical sectional view through the rotary drum.

Fig. 5 represents a fragmentary detail sectional view of the elevator.

Fig. 6 represents a perspective view of one of the toothed bars of the rotary separator.

Fig. 7 represents a top plan view of the frame for supporting the endless conveyor.

Fig. 8 represents a cross sectional view of the chute, taken substantially on the line 8—8 of Fig. 1.

Fig. 9 represents an elevational view showing the drive gears.

Figure 1:
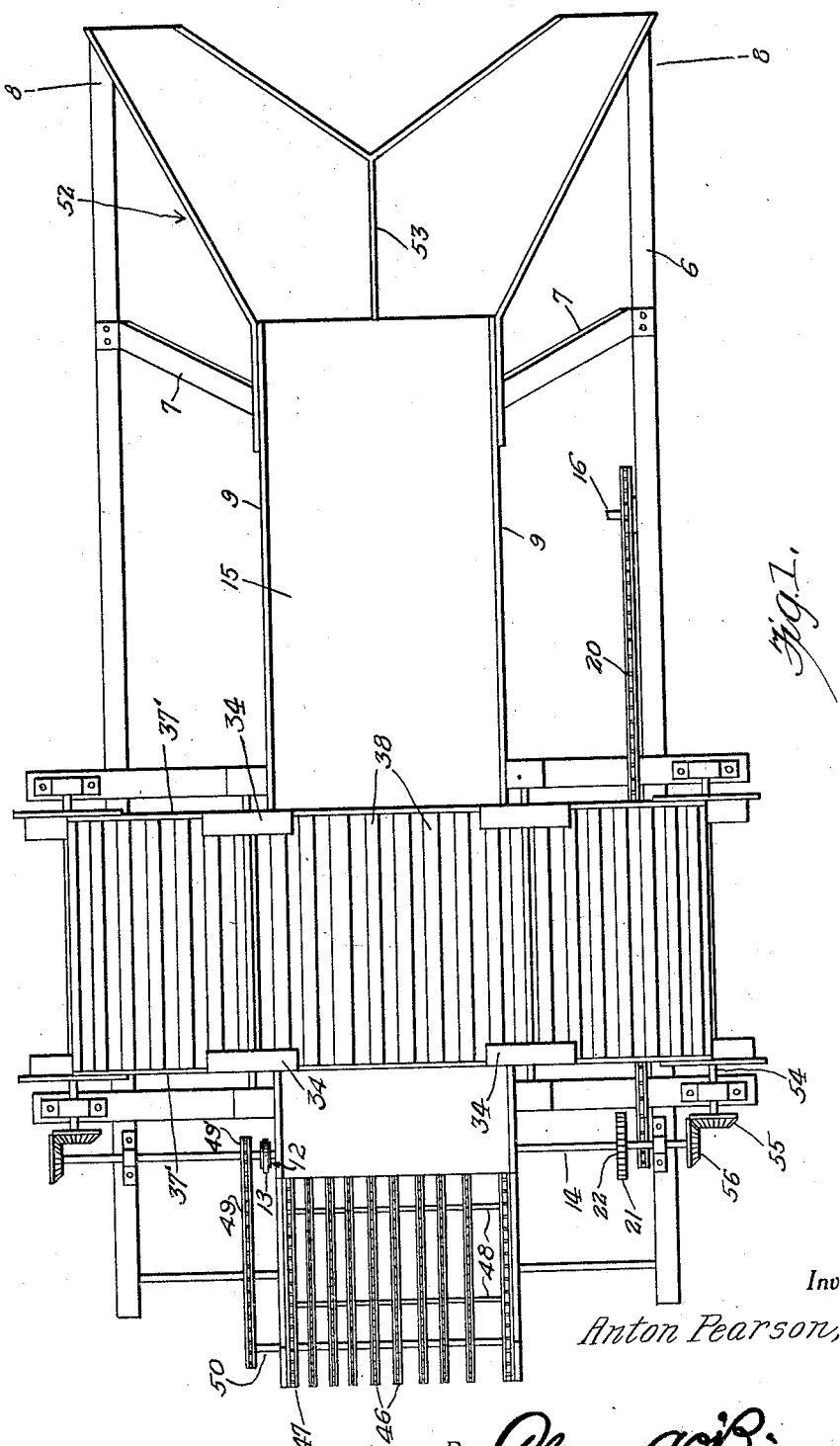
Figure 1 represents a top plan view of the machine.

Referring to the drawings wherein like numerals designate like parts, it can be seen that the machine is to be mounted in association with a potato digger, generally referred to by numeral 5 in Fig. 2, the same being shown in dotted lines.

Encompassing the major portion of the potato digger is rectangular frame 6 provided with the uprights 7 for supporting the conveyor frame generally referred to by numeral 8, which frame includes a pair of side members 9—9 between which rollers 10 are rotatably mounted.

The roller at one end of the frame is on a shaft 11 equipped with a pulley 12, while the cross belt 13 trained over the pulley wheel 12 and a pulley on the shaft 14 permits the endless conveyor belt 15 to be driven by the power of the potato digger.

As is clearly shown in Fig. 2, the potato digger mechanism may be operated by the axle 16, or at any rate, the present invention is to be operated by the axle 16, which carries a sprocket wheel 17. A sprocket wheel 18 is located on the shaft 19 and a chain 20 trained over the wheels 17 and 18; these provide means whereby the shaft 19 is driven by the potato digger, while a gear 21 on the shaft 19 and a gear 22 on the shaft 14 in mesh with each other supply the means whereby the belt 13 is operated.

Vertically extending standards 33 support rollers 34 while horizontally disposed beams 35 on the frame 6 support flanged wheels 36, the rollers 34 and the wheels 36 serving to rotatably support the rotary drum generally referred to by numeral 37. This drum includes a pair of ring shaped or annular side members 37' connected by the cross members 38. Thus the drum is of slotted construction and the side members 37' form inwardly extended flanges at the ends of the slotted drum.

To certain of the cross members 38 are secured the toothed bars 39, each provided with a multiplicity of teeth or fingers 40. These teeth or fingers are curved longitudinally in the manner clearly shown in Figs. 4 and 6. It will also be seen that the flanged wheels 36 engage the side members 37' to prevent any lateral displacement of the drum.

It can be observed, that the endless conveyor generally referred to by numeral 41 includes the side frame members 42. Sprocket wheels 43 and 44 are provided at the upper and lower ends of the conveyor 41, while auxiliary sprocket wheels 45 are provided at the underlying end of the frame 6. There may be any predetermined number of wheels 43, 44 and 45 to accommodate a like number of endless chains 46, which chains are interposed between heavier side chains 47—47, which are connected by the cross members 48 to which the chains 46 are connected so as to maintain the position of the chains 46 in substantial parallel relation, although slack as in the manner shown in Fig. 5, so as to form pockets or loops for receiving the potatoes and vines discharged from the potato digger.

A chain 49 is trained over the sprocket 49' on the shaft 14, and a sprocket on the shaft 50 supporting the sprockets 43 supplying means whereby power is transmitted to the elevator generally referred to by numeral 41.

Beneath the upper portion of the elevator 41 is the inclined trough 51 for receiving the potatoes dropping from the conveyor 41. The potatoes passing through the trough 51 will fall into the drum generally referred to by numeral 37 to be carried upwardly by the teeth 40 on the bars 39. As the potatoes are separated from the twigs of the vines, and the earth, they approach the position above the conveyor belt 15, onto which they gravitate and are carried off to the chute generally referred to by numeral 52.

The chute 52 is of Y-shape, each of the diverging portions of which provides an individual trough, while the partition 53 separates the trough into two sections and the potatoes will be divided to discharge through both of the trough sections.

It can be seen that certain of the wheels 36 are on the shaft 54, and this shaft 54 carries a bevel gear 55 for mesh with the bevel gear 56 on the aforementioned shaft 14. Obviously, through the use of this novel machine, potatoes can be quickly and efficiently stripped of their vines and dirt connections.

While the foregoing specification sets forth the invention in definite terms, it is to be understood that numerous changes in the shape, size and materials may be resorted to without departing from the spirit and scope of the invention as claimed hereinafter.

Having thus described my invention, what I claim as new is:—

1. A potato picker attachment for potato diggers comprising a frame, a vertically arranged slotted drum rotatably supported in said frame, and transversely arranged in said frame, a plurality of rows of curved fingers carried by the inner circumference of the drum and forming means for elevating the potatoes, a longitudinally arranged conveyor frame supported on the frame and having an intermediate part located within the drum, said conveyor frame sloping downwardly and forwardly with its lower end receiving the potatoes and vines from the diggers, endless chains supported for travelling movement through the conveyor, some of the chains being arranged in loops for forming pockets for holding the potatoes and vines, with the vines discharged from the top of the conveyor after the potatoes have been separated therefrom, a chute for delivering the potatoes from the conveyor into the low part of the drum, and a second conveyor, including an endless travelling member, passing through the upper part of the drum for receiving the potatoes dropped from the fingers and means for actuating the two conveyors and rotating the drum.

2. A potato picker attachment for potato diggers comprising a frame, a vertically arranged slotted drum rotatably supported in said frame, and transversely arranged in said frame, a plurality of rows of curved fingers carried by the inner circumference of the drum and forming means for elevating the potatoes, a longitudinally arranged conveyor frame supported on the frame and having an intermediate part located within the drum, said conveyor frame sloping downwardly and forwardly with its lower end receiving the potatoes and vines from the diggers, endless chains supported for travelling movement through the conveyor, some of the chains being arranged in loops for forming pockets for holding the potatoes and vines, with the vines discharged from the top of the conveyor after the potatoes have been separated therefrom, a chute for delivering the potatoes from the conveyor into the low part of the drum, and a second conveyor, including an endless travelling member, passing through the upper part of the drum for receiving the potatoes dropping from the fingers and means for actuating the two conveyors and rotating the drum, said drum including side members of ring shape and formed with inwardly extending flanges for holding the potatoes in the drum.

In testimony whereof I affix my signature.

ANTON PEARSON.